Feb. 16, 1954  R. W. BOWERS ET AL  2,669,261
HYDRAULICALLY-ADJUSTABLE HORIZONTAL BAND-SAWING MACHINE
Filed June 25, 1952  3 Sheets-Sheet 1

INVENTORS.
Raymond W. Bowers
Carl J. Alexander
By Otto A. Earl
Attorney

Feb. 16, 1954    R. W. BOWERS ET AL    2,669,261
HYDRAULICALLY-ADJUSTABLE HORIZONTAL BAND-SAWING MACHINE
Filed June 25, 1952    3 Sheets-Sheet 2

Feb. 16, 1954 R. W. BOWERS ET AL 2,669,261
HYDRAULICALLY-ADJUSTABLE HORIZONTAL BAND-SAWING MACHINE
Filed June 25, 1952 3 Sheets—Sheet 3
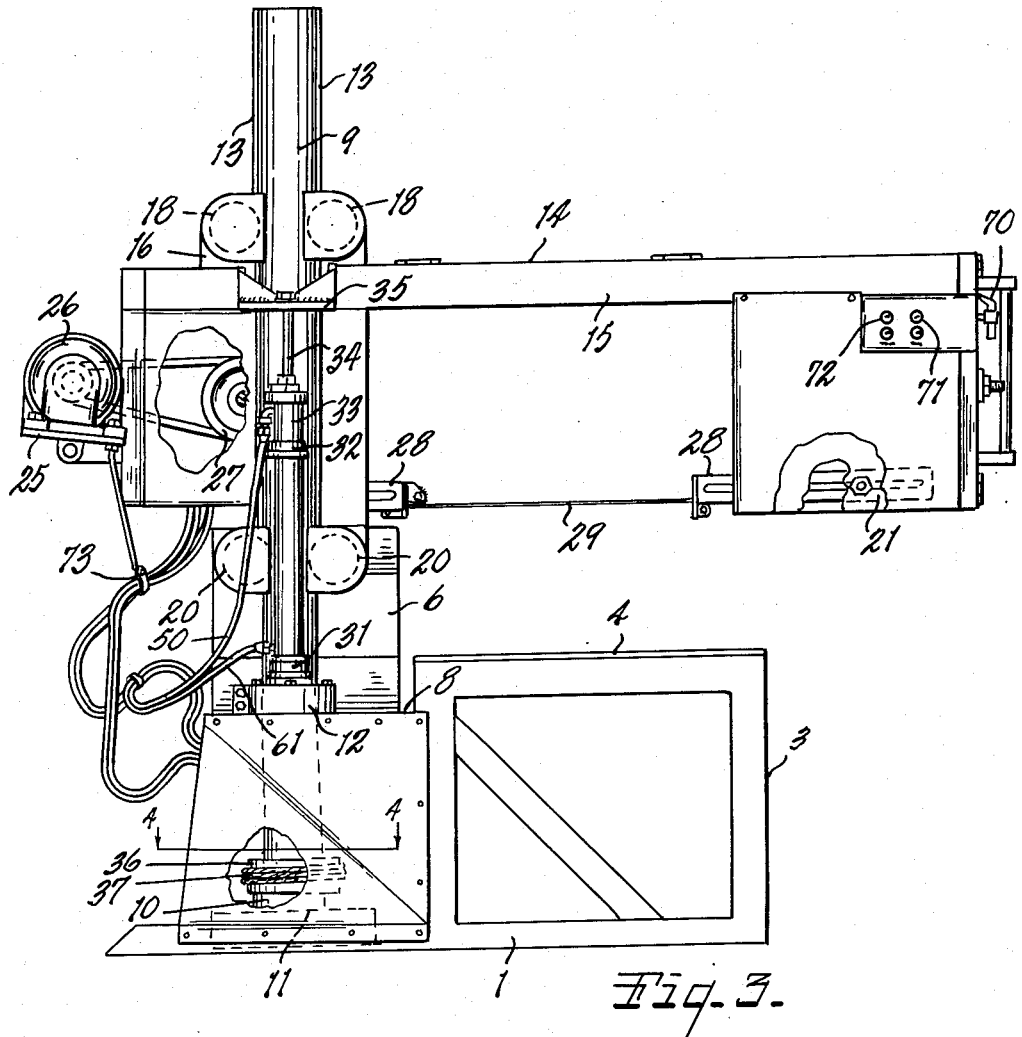
Fig. 3.
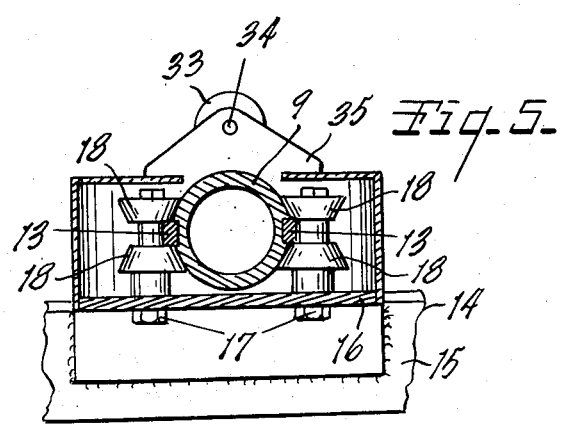
Fig. 5.
INVENTORS
Raymond W. Bowers
BY Carl J. Alexander
Attorney.

Patented Feb. 16, 1954

2,669,261

UNITED STATES PATENT OFFICE 2,669,261

HYDRAULICALLY-ADJUSTABLE HORIZONTAL BAND-SAWING MACHINE

Raymond W. Bowers, Three Rivers, and Carl J. Alexander, Moore Park, Mich., assignors to Wells Manufacturing Corporation, Three Rivers, Mich., a corporation of Michigan Application June 25, 1952, Serial No. 295,511

11 Claims. (Cl. 143—19)

This invention relates to improvements in a sawing machine.

The principal objects of this invention are:

First, to provide a sawing machine which is adjustable through a wide range of vertically and horizontally displaced positions for placing the saw in various positions or for making long cuts by advancing the saw to the work.

Second, to provide a power-driven support for a band saw by means of which the working reach of the saw may be translated vertically or horizontally in an arcuate swinging motion.

Third, to provide a band saw mounted on a vertically adjustable and horizontally swingable frame with power operated, controllable mechanism for regulating the elevation and swinging motion of the saw.

Fourth, to provide a band saw mounted on a vertically and swingable adjustable frame with power-driven means for controlling the elevation and swinging of the saw and controls for regulating the power means from two positions relative to the saw.

Fifth, to provide a band saw capable of operating on large work pieces in varying positions by adjustment of the saw blade relative to the work piece.

Sixth, to provide power-driven and accurately controllable means for swinging a band saw and its supporting frame in a horizontal arc to locate the saw relative to the work or to make horizontal cuts in the work.

Seventh, to provide a sawing machine which is relatively inexpensive to manufacture but which has a high capacity or ability to work on large work pieces in an accurately controllable manner.

Other objects and advantages relating to details of the invention will be appreciated from a consideration of the following description and claims. The drawings of which there are three sheets illustrate a highly practical and commercially operative form of machine.

Figure 3 is a rear elevational view of the machine with portions of the enclosing panels broken away.

Figure 4 (Sheet 2) is a fragmentary horizontal cross sectional view through the base of the machine taken along the plane of the line 4—4 in Figure 3 and illustrating the horizontal adjusting mechanism of the saw.

Figure 5 (Sheet 3) is a fragmentary horizontal cross sectional view through the upright column and saw frame taken along the plane in 5—5 in Figure 1 and illustrating the vertically adjustable guide rollers.

Figure 6 (Sheet 1) is a schematic diagram illustrating the hydraulic and electrical connections for operating and adjusting the saw.

Figure 1:
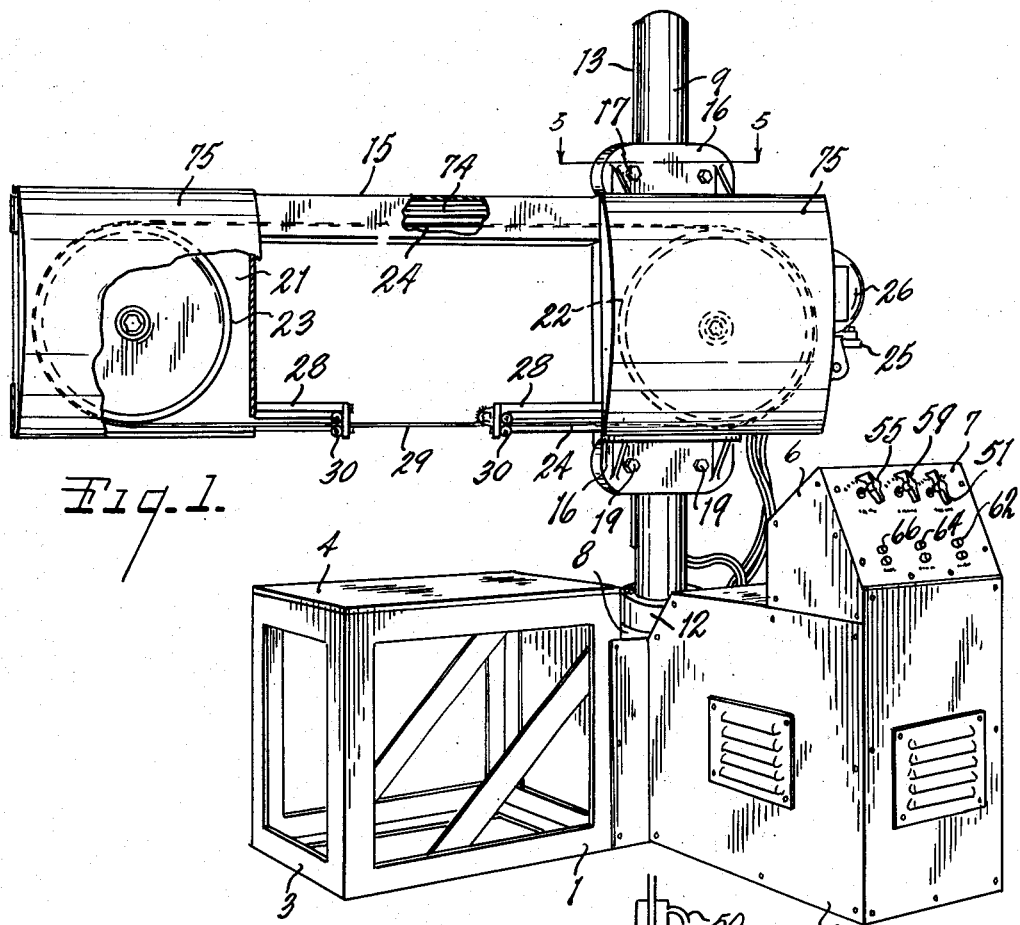
Figure 1 is a perspective view of the sawing machine with a portion of the guard casing around the idler wheel broken away.

As is most clearly illustrated in Figure 1 the machine is built on a generally L shape base 1 having a forwardly extending branch 2 and a laterally extending branch 3. The details of construction of the base are relatively unimportant and are therefore not illustrated or described in great detail other than to point out that the several elements which make up the base are of sufficiently heavy construction to support the operating elements of the saw. The left branch 3 of the base is provided with a work supporting table 4 and the front branch 2 of the base is desirably enclosed by suitable panels to provide a motor compartment 5. A control cabinet 6 having a control panel 7 is supported on the forward end of the front branch 2.

The two branches of the base are rigidly joined together and form at their intersection a platform 8 through which a heavy column 9 extends vertically to a lower bearing 10 supported on the bottom of the base. The lower end of the column is suitably shouldered as at 11 (see Figure 3) or otherwise provided with a thrust surface axially engaging the bearing 10 and an upper bearing 12 bolted to the platform 8 serves to coact with the bearing 10 in supporting the column in fixedly upright but rotatable position. Above the upper bearing 12 the sides of the column 9 are provided with one or more vertically extending ribs or keys 13, two ribs being illustrated in the present instance.

Figure 2:
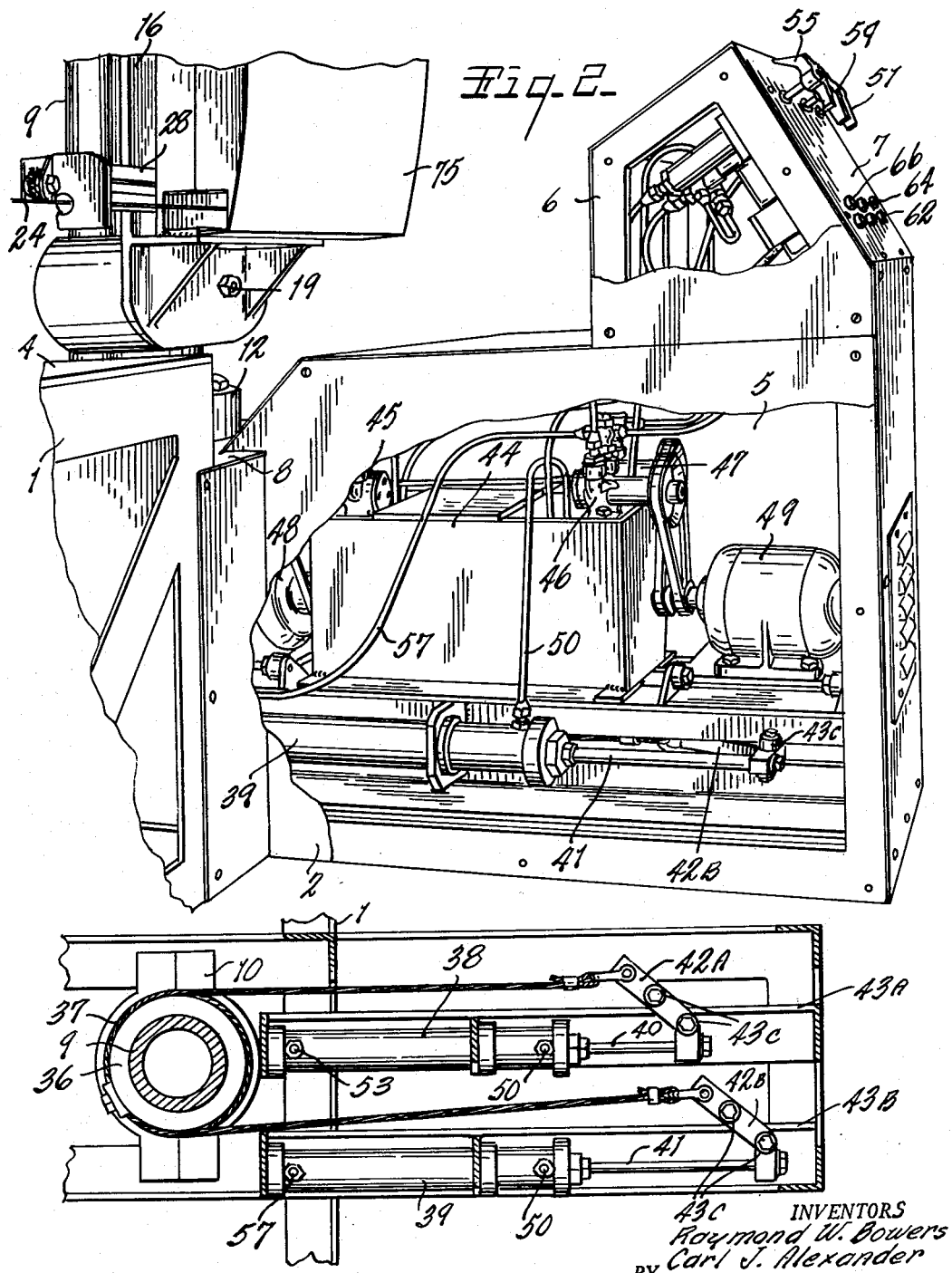
Figure 2 is an enlarged fragmentary perspective view of the power-driven means for adjusting the saw and the controls for the adjusting means.

A band saw frame generally indicated at 14 is vertically adjustably mounted on the column 9. The frame 14 includes a laterally projecting beam 15 of relatively heavy cross section secured at its inner end to a head that includes the heavy inner base plate 16 (see Figure 2). The upper edge of the plate 16 above the beam 15 is provided with two laterally projecting pins or spindles 17 located on opposite sides of the column 9. The pins rotatably support guide rollers 18 which are milled to roll along opposite sides of the column 9. With particular reference to Figure 5 it will be noted that the rollers on the spindles are mounted on opposite sides of the keys 13 so that while the frame 14 is vertically adjustable on the column it is not rotatable with respect to the column. A similar set of spindles 19 and guide rollers 20 are provided on the bottom of the plate 16 below the lower reach of the saw.

The outer or swinging end of the beam 15 carries a second plate 21 which depends below the beam parallel to the inner plate 16. The plates 16 and 21 together with associated bracing structure not shown in detail serve to rotatably support the pulley wheels 22 and 23 respectively around which the band saw 24 is trained. A motor support bracket 25 supported from the inner plate 16 serves to support the saw motor 26 which is drivingly connected to the pulley wheel 22 by means of suitable belts and pulleys 27 (see Figure 3).

Slidably adjustably carried along the lower edges of the plates 16 and 21 are a pair of saw guide arms 28 which are laterally adjustable toward and away from each other along the lower working reach 29 of the saw. The opposed ends of the guide arms 28 are provided with rollers 30 (see Fig. 1) for supporting and guiding the working reach of the saw and it will be appreciated that the rollers 30 may be arranged to direct the working reach of the saw in a horizontally flat position of the saw or the rollers may be arranged to twist the working reach of the saw into a vertical plane for vertical sawing motion.

Secured to the side of the column 9 by brackets 31 and 32 welded to the column is an upstanding hydraulic cylinder 33 (see Fig. 3) having a piston with a piston rod 34 extending from the upper end of the cylinder. A laterally and horizontally extending bracket 35 on the top beam 15 overlies the cylinder 33 and forms a driving connection between the piston rod 34 and the frame 14. Thus extention of the piston rod 34 from the cylinder 33 will raise the frame 14 along the column 9 and keys 13.

The lower end of the column 9 within the motor compartment 5 is provided with a cylindrical collar or surface 36 around which a control cable 37 is wrapped with the opposite ends of the cable extending from opposite sides of the column in generally parallel relation as is best illustrated in Figure 4. The interior of the motor compartment provides support for a horizontally disposed hydraulic cylinder 38 for turning the column in a clockwise direction. The motor compartment is further provided with a cylinder 39 for turning the column in a counter-clockwise direction. The piston rods 40 and 41 of the cylinders 38 and 39 respectively are connected to the ends of links 42A and 42B. The links extend through horizontally slotted struts 43A and 43B secured to the base while the two ends of the cable 37 are connected to the opposite ends of the links. Rollers 43C carried on the links engage opposite sides of the struts so that extension of the piston rods causes rotation of the column 9 whenever power is supplied to either of the cylinders 38 or 39.

The mechanism for operating and controlling the several hydraulic cylinders includes a storage tank or sump 44 mounted within the motor compartment 5 and provided at one end with a saw raising pump 45. The other end of the storage tank carries two pumps 46 and 47 connected respectively to the rear or working ends of the cylinders 39 and 38. An electric motor 48 is connected to drive the saw elevating pump 45 while a third electric motor 49 is belt connected to drive the two pumps 46 and 47. Each of the pumps is provided with a suitable inlet or suction connection within the tank 44 and each of the hydraulic cylinders 33, 38 and 39 is provided with a vent or bleed return connection 50 from its outer or non-working end to the storage tank 44.

The control cabinet 6 and panel 7 serve to support three valve structures and three electrical switches for controlling the operation of the saw. The connections both hydraulic and electric between the several elements of the saw driving mechanism and the several valves and switches may best be understood from a consideration of Figures 1 and 6. The right control valve 51 is connected to the output conduit 52 from the pump 47 and operates as a flow control valve for regulating the delivery of hydraulic fluid through conduit 53 to the rear working end of the cylinder 38. Fluid not delivered to the cylinder is by-passed and returned to the storage tank through a return conduit 54. The left valve 55 is similarly connected between the output conduit 56 from the pump 46 and the delivery conduit 57 to regulate the operation of the left cylinder 39. A by-pass conduit 58 returns unused fluid to the storage tank. Center valve 59 is a simple adjustable bleed valve connected in the drain conduit 60 from the saw elevating cylinder 32 to regulate the rate at which fluid will flow from the cylinder and permit the saw frame 14 to lower. The pump 45 delivers directly to the lower working end of the elevating cylinder 32 through a conduit 61.

The electrical connections to the several motors and switches are as follows. The right switch 62 on the control panel closes a circuit through the conductor 63 for energizing the saw motor 26. The middle switch 64 closes a circuit through the conductor 65 to energize the motor 49 for horizontally turning the column and saw frame. The left switch 66 closes a circuit through the conductor 67 to energize the saw elevating motor 48. A common return conductor for all of the motors is indicated at 68 and a power source is indicated at 69.

In order to make the operation of the saw more convenient and to permit the adjustment and control thereof from a position remote from the control panel 7, the outer plate 21 on the swinging end of the saw frame 14 carries a manually operative control valve 70 and two electrical switches 71 and 72 (see Figures 3 and 6). The valve 70 is a simple adjustable flow control valve similar to valve 59 and is connected in fluid series in the conduit 60 so that both the valve 70 and the valve 59 may be used to control the rate of descent of the saw frame on the column 9. Thus an operator having once determined a preliminary rate of descent by adjustment of valve 59 may thereafter decrease the rate of descent or completely stop the descent of the saw while standing at the outer end of the saw frame where he may better observe the action of the saw.

Switch 71 on the outer end of the saw frame is electrically connected in series with the previously described switch 62 so that the operation of the saw motor 26 can be controlled from either the control panel 7 or the swinging end of the saw frame. Switch 72 is electrically connected in series with the previously described switch 66 so that the operation of the saw elevating motor 48 may similarly be controlled from either of the two operated positions. The electrically conducting and hydraulic conduits for connecting the switches 71 and 72 and the valve 70 in the manner described are carried upwardly along the plate 16 as at 73 and outwardly along the beam 15 as at 74 in Figure 1.

Desirably suitable inclosing panels and doors are provided on the frame 14 to enclose the pulley wheels as at 75. The saw motor 26 being carried by the frame 14 moves upwardly and downwardly with the saw and also swings therewith eliminating complicated driving connections to the saw itself.

Having thus described the invention what is claimed as new and desired to secure by Letters Patent is:

1. A sawing machine comprising, an L-shaped base having a work support on one branch thereof and a motor compartment in the other branch thereof, a vertical column rotatably supported at the junction of the branches of said base and extending thereabove, means for rotating said column including a cable wrapped therearound and a pair of hydraulic cylinders mounted horizontally in said compartment and having pistons connected to opposite ends of said cable, a head vertically slidably mounted on said column above said base and having a laterally projecting beam, said column having a guideway engageable with said head whereby said head and beam rotate with said column, a third fluid operated cylinder secured in upright position to said column and having an upwardly extensible piston rod connected to said head to elevate the same, a plate carried on the outer end of said beam and spaced laterally from said head, a band saw including pulley wheels therefor mounted on said plate and head with the working reach of the saw positioned below said beam, laterally adjustable bars on said plate and head extensible toward and away from each other alongside the working reach of said saw, guide rollers on said bars engageable with said saw to locate the working reach thereof, a motor for driving said saw mounted on said head, a pair of fluid pumps mounted in said motor compartment and connected to separately supply said pair of cylinders, a single motor connected to drive said pair of pumps, a third pump in said compartment connected to supply said third cylinder, a third motor connected to drive said third pump, a pair of valves connected to separately regulate the output of said pair of cylinders and mounted above said motor compartment, a third valve mounted above said compartment and connected to regulate the release of fluid from said third cylinder, three switches mounted above said compartment and electrically connected to separately control said three motors, and a remote valve and remote switches carried on the swinging end of said beam, said remote valve being connected in fluid series with said third valve, said remote switches being connected in electrical series with said third motor and said saw motor.

2. A sawing machine comprising, an L-shaped base having a work support on one branch thereof and a motor compartment in the other branch thereof, a vertical column rotatably supported at the junction of the branches of said base and extending thereabove, means for rotating said column including a cable wrapped therearound and a pair of hydraulic cylinders mounted horizontally in said compartment and having pistons connected to opposite ends of said cable, a head vertically slidably mounted on said column above said base and having a laterally projecting beam, said column having a guideway engageable with said head whereby said head and beam rotate with said column, a third fluid operated cylinder secured in upright position to said column and having an upwardly extensible piston rod connected to said head to elevate the same, a plate carried on the outer end of said beam and spaced laterally from said head, a band saw including pulley wheels therefor mounted on said plate and head with the working reach of the saw positioned below said beam, a motor for driving said saw mounted on said head, a pair of fluid pumps mounted in said motor compartment and connected to separately supply said pair of cylinders, a single motor connected to drive said pair of pumps, a third pump in said compartment connected to supply said third cylinder, a third motor connected to drive said third pump, a pair of valves connected to separately regulate the output of said pair of pumps to said pair of cylinders and mounted above said motor compartment, a third valve mounted above said compartment and connected to regulate the release of fluid from said third cylinder, three switches mounted above said compartment and electrically connected to separately control said three motors, and a remote valve and remote switches carried on the swinging end of said beam, said remote valve being connected in fluid series with said third valve, said remote switches being connected in electrical series with said third motor and said saw motor.

3. A sawing machine comprising, a base having a work support on one end thereof and a motor compartment in the other end thereof, a vertical column rotatably supported by said base between said support and said compartment and extending thereabove, means for rotating said column including a cable wrapped therearound and a pair of hydraulic cylinders having pistons connected to opposite ends of said cable, a head vertically slidably mounted on said column above said base and having a laterally projecting beam, said column having a guideway engageable with said head whereby said head and beam rotate with said column, a third fluid operated cylinder mounted in upright position to rotate with said column and having an upwardly extensible piston rod connected to said head to control the elevation of the same, a plate carried on the outer end of said beam and spaced laterally from said head, a band saw including pulley wheels therefor mounted on said plate and head with the working reach of the saw positioned below said beam, a motor for driving said saw mounted on said head, a pair of fluid pumps mounted in said motor compartment and connected to separately supply said pair of cylinders, a second motor connected to drive said pair of pumps, a third pump in said compartment connected to supply said third cylinder, a third motor connected to drive said third pump, a pair of valves connected to separately regulate the output of said pair of pumps to said pair of cylinders and mounted above said motor compartment, a third valve mounted above said compartment and connected to regulate the release of fluid from said third cylinder, three switches mounted above said compartment and electrically connected to separately control said three motors, and a remote valve and remote switches carried on the swinging end of said beam, said remote valve being connected in fluid series with said third valve, said remote switches being connected in electrical series with said third motor and said saw motor.

4. A sawing machine comprising, a base having a work support on one end thereof and a motor compartment in the other end thereof, a vertical column rotatably supported on said base between said support and said compartment and extending thereabove, means for rotating said column including a cable wrapped therearound and a pair of hydraulic cylinders having pistons connected to opposite ends of said cable, a head vertically slidably mounted on said column above said base and having a laterally projecting beam, said column having a guideway engageable with said head whereby said head and beam rotate with said column, a third fluid operated cylinder mounted to rotate with said column and having an extensible piston rod connected to said head to control the elevation of the same, a plate carried on the outer end of said beam and spaced laterally from said head, a band saw including pulley wheels therefor mounted on said plate and head with the working reach of the saw positioned below said beam, a motor for driving said saw mounted on said head, a pair of fluid pumps mounted in said motor compartment and connected to separately supply said pair of cylinders, a second motor connected to drive said pair of pumps, a third pump in said compartment connected to supply said third cylinder, a third motor connected to drive said third pump, a pair of valves connected to separately regulate the output of said pair of pumps to said pair of cylinders and mounted above said motor compartment, a third valve mounted above said compartment and connected to regulate the release of fluid from said third cylinder, three switches mounted above said compartment and electrically connected to separately control said three motors, and a remote valve and remote switch carried on the swinging end of said beam, said remote valve being connected in fluid series with said third valve, said remote switch being connected in electrical series with said saw motor.

5. A sawing machine comprising, a base having a work support and a motor compartment, a vertical column rotatably supported by said base and extending thereabove, means for rotating said column including a pair of hydraulic cylinders mounted in said compartment and having pistons connected to oppositely rotate the column, a head vertically slidably mounted on said column above said base and having a laterally projecting beam, said column having a guideway engageable with said head whereby said head and beam rotate with said column, a third fluid operated cylinder carried by said base and having an extensible piston rod connected to said head to control the elevation of said head, a journal carried on the outer end of said beam and spaced laterally from said head, a band saw including pulley wheels therefor mounted on said journal and said head with the working reach of the saw positioned below said beam, a motor for driving said saw mounted on said head, a pair of fluid pumps mounted in said motor compartment and connected to separately supply said pair of cylinders, a single motor connected to drive said pair of pumps, a third pump in said compartment connected to supply said third cylinder, a third motor connected to drive said third pump, a pair of valves connected to separately regulate the output of said pair of pumps to said pair of cylinders and mounted at one control station on said base, a third valve mounted at said station and connected to regulate the release of fluid from said third cylinder, three switches mounted at said station and electrically connected to separately control said three motors, and a remote valve and remote switch carried on the swinging end of said beam, said remote valve being connected in fluid series with said third valve, said remote switch being connected in electrical series with said saw motor.

6. A sawing machine comprising, a base having a work support and a motor compartment, a vertical column rotatably supported by said base and extending thereabove, means for rotating said column including a pair of hydraulic cylinders mounted in said compartment and having pistons connected to oppositely rotate the column, a head vertically slidably mounted on said column above said base and having a laterally projecting beam, said column having a guideway engageable with said head whereby said head and beam rotate with said column, a third fluid operated cylinder carried by said base and having an extensible piston rod connected to control the elevation of said head, a journal carried on the outer end of said beam and spaced laterally from said head, a band saw including pulley wheels therefor mounted on said journal and said head with the working reach of the saw positioned below said beam, a motor for driving said saw mounted on said head, a pair of fluid pumps connected to separately supply said pair of cylinders, a single motor connected to drive said pair of pumps, a third pump connected to supply said third cylinder, a third motor connected to drive said third pump, a pair of valves connected to separately regulate the output of said pair of pumps to said pair of cylinders and mounted at one control station on said base, a third valve mounted at said station and connected to regulate the release of fluid from said third cylinder, and three switches mounted at said station and electrically connected to separately control said three motors.

7. A sawing machine comprising a base having a work support and a control panel thereon, an upright column rotatably supported by said base and extending thereabove, power operated means in said base connected to rotate said column, a head vertically slidably mounted on said column above said base, guide means on said column engageable with said head to prevent relative rotation between said head and said column, other power operated means connected to said head to adjust the elevation thereof, a laterally projecting framework on said head, a band saw rotatably carried by said head and said framework with the working reach of the saw spaced below the framework and translatable across the work support of said base upon rotation of said column, a motor carried by said head and connected to rotate said saw, controls mounted on said panel and connected to regulate said power operated means and said motor, and other controls located remotely from said panel on the swinging end of said frame and connected in series with the first mentioned controls for said motor and for said other power operated means.

8. A sawing machine comprising a base having a work support and a control panel thereon, an upright column rotatably supported by said base and extending thereabove, power operated means in said base connected to rotate said column, a head vertically slidably mounted on said column above said base, guide means on said column engageable with said head to prevent relative rotation between said head and said column, other power operated means connected to said head to adjust the elevation thereof, a laterally projecting framework on said head, a band saw rotatably carried by said head and said framework with the working reach of the saw spaced below the framework and translatable across the work support of said base upon rotation of said column, a motor carried by said head and connected to rotate said saw, controls mounted on said panel and connected to regulate said power operated means and said motor, and other controls located remotely from said panel on the swinging end of said frame and connected in series with the first mentioned controls for said motor and for one of said power operated means.

9. A sawing machine comprising a base having a work support and a control panel thereon, an upright column rotatably supported by said base and extending thereabove, power operated means in said base connected to rotate said column, a head vertically slidably mounted on said column above said base, guide means on said column engageable with said head to prevent relative rotation between said head and said column, other power operated means connected to said head to adjust the elevation thereof, a laterally projecting framework on said head, a band saw rotatably carried by said head and said framework with the working reach of the saw spaced below the framework and translatable across the work support of said base upon rotation of said column, a motor carried by said head and connected to rotate said saw, controls mounted on said panel and connected to regulate said power operated means and said motor, and other controls located remotely from said panel and connected in series with the first mentioned controls for said motor and with the controls for one of said power operated means.

10. A sawing machine comprising, a base, a column rotatably supported by said base and extending thereabove, a pair of fluid operated cylinders having piston rods connected to opposite ends of a cable wrapped around said column for rotating said column in opposite directions, a head slidably mounted on said column and having a framework projecting laterally therefrom, another fluid operated cylinder carried by said column and having a piston rod connected to said head to vary the elevation of said head on said column, said head and said column being interconnected to prevent relative rotation therebetween, a band saw rotatably carried by said head and said framework with the working reach of the saw spaced below said framework, and a motor carried by said head and connected to drive said saw.

11. A sawing machine comprising, a base, a column rotatably supported by said base and extending thereabove, a cylinder having a fluid operated piston drivingly connected to said column for rotating said column, a head slidably mounted on said column and having a framework projecting laterally therefrom, another cylinder carried by said column and having a fluid operated piston rod connected to said head to vary the elevation of said head on said column, said head and said column being interconnected to prevent relative rotation therebetween, a band saw rotatably carried by said head and said framework with the working reach of the saw spaced below said framework, and a motor carried by said head and connected to drive said saw.

RAYMOND W. BOWERS.
CARL J. ALEXANDER.

References Cited in the file of this patent

UNITED STATES PATENTS

| Number | Name | Date |
|---|---|---|
| 906,839 | Webster | Dec. 15, 1908 |
| 950,638 | Nolan et al. | Mar. 1, 1910 |
| 1,344,096 | Sprague | June 22, 1920 |
| 1,368,777 | Wernicke | Feb. 15, 1921 |
| 2,365,408 | Hillyer | Dec. 19, 1944 |
| 2,411,623 | Jaques | Nov. 26, 1946 |
| 2,584,837 | Bookhultz et al. | Feb. 5, 1952 |